June 24, 1930.  H. JUNKERS  1,766,025
ARRANGEMENT OF RUDDERS FOR AIRCRAFT
Filed Jan. 4, 1929  2 Sheets-Sheet 2
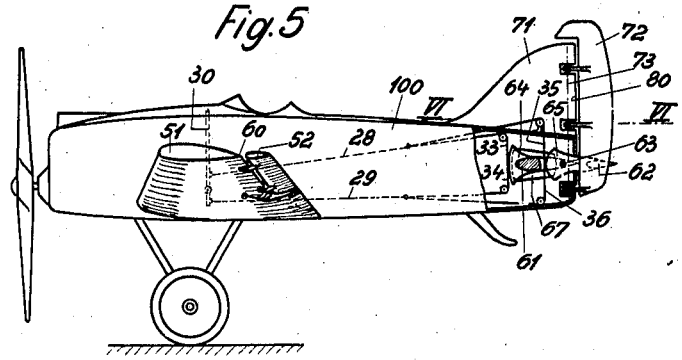
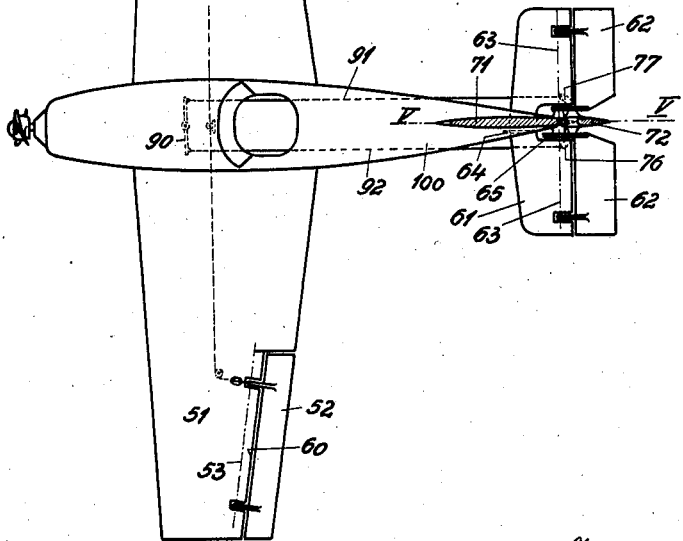
Inventor:
Hugo Junkers
by
Atty.

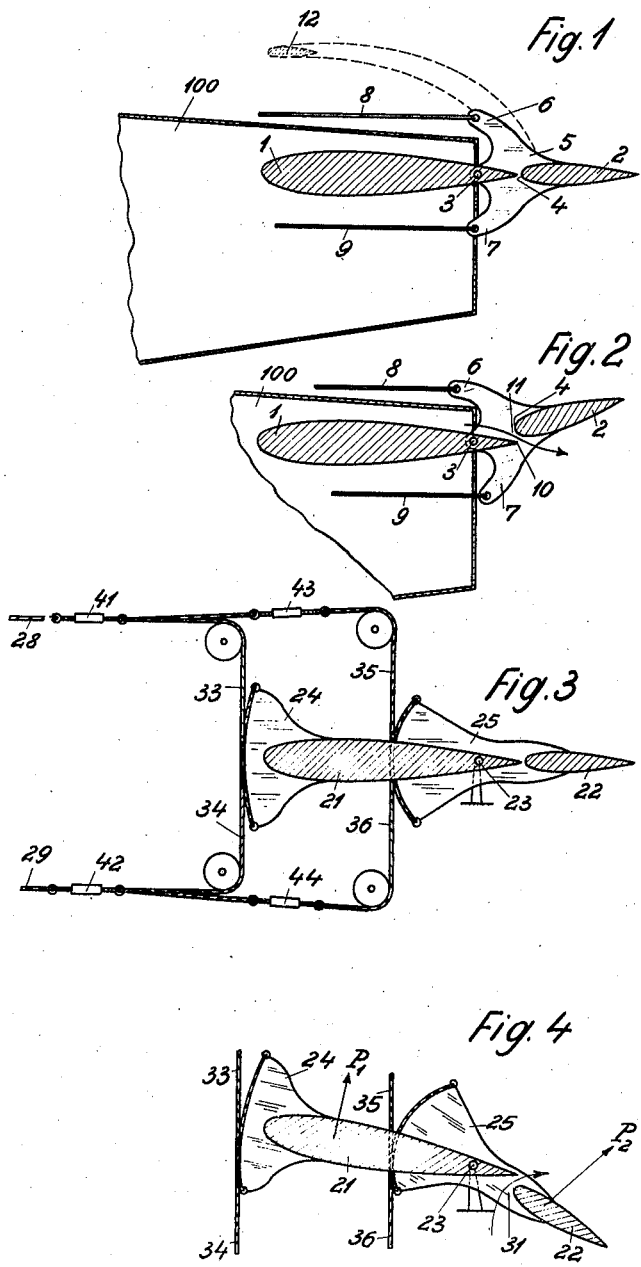

Patented June 24, 1930

1,766,025

UNITED STATES PATENT OFFICE

HUGO JUNKERS, OF DESSAU, GERMANY

ARRANGEMENT OF RUDDERS FOR AIRCRAFT

Application filed January 4, 1929, Serial No. 330,331, and in Germany January 14, 1928.

My invention refers to the arrangement of rudders (this term comprising also elevators and ailerons) for aircraft and more especially flying machines. As a rule these directional controlling means consist of two surfaces closely adjacent each other in the direction of flight viz. a damping surface (which may be a wing, fin or stabilizer surface) and the rudder. In order to steer the craft, the rudder alone is usually rocked while the damping surface remains stationary relative to the aircraft.

Arrangements are however known, in which the damping surface is rocked or oscillated simultaneously with the rudder in which case the rudder is imparted a greater angular deflection than the damping surface.

In these known arrangements the flow of air around the rudder is unfavorably influenced by the damping surface, which is arranged closely in front of the rudder and if the rudder is deflected to a comparatively great angle, this flow is liable to become unsteady. In consequence thereof the action of the rudder is rendered nonuniform, the rudder effect is impaired and the operation of the rudder is interfered with. My invention has for its purpose to avoid these drawbacks and to obtain an increased rudder effect. I obtain this according to this invention by placing the pivotal axis of the stream-lined rudder in front of the forward edge of the rudder and into the damping surface, which is provided with a sharp rear edge. In consequence of this arrangement, when the rudder is deflected relative to the damping surface—no matter in which direction,—there is formed between the rear edge of the damping surface and the front edge of the rudder a nozzle-like gap through which air can flow from the pressure side of the rudder to the suction side. Thus the gap effect, known in connection with wings, is obtained also in connection with the rudders, this gap effect being known to prevent unsteadiness of the air flow in the range of smaller angular deflections of the rudder, so that such unsteadiness will arise only at materially larger deflections than hitherto. The air forces acting on the rudder are thus increased and in consequence thereof the rudder effect obtainable is materially increased also. The air force acting on the rudder and the turning moment exerted on the rudder by the air, both of which are dependent from the angle through which the rudder has been deflected, now vary in a more uniform manner, and the greater steadiness of the turning moment of the rudder, which is thus obtained, greatly facilitates the operation of the rudder.

Obviously the new arrangement can be applied to stationary and to oscillatory damping surfaces (wings, fins, or stabilizer surfaces) and to rudders of all kinds.

In the drawings affixed to the specification and forming part thereof, two modifications embodying my invention are illustrated diagrammatically by way of example.

In the drawings—

Figs. 1 and 2 show a stationary damping surface and a rudder pivoted to it in the middle position in which the parts are in alignment, and in the position where the rudder is deflected, respectively.

Figs. 3 and 4 are similar illustrations of an arrangement where the damping surface is also arranged for oscillation.

Figs. 5 and 6 are an elevation, partly in section on the line V—V in Fig. 6, and a plan view, partly in section on the line VI—VI in Fig. 5, respectively, embodying this invention.

Referring first to Figs. 1 and 2, the directional controlling means is shown as an elevator arranged at the tail end of a fuselage 100. 1 is the stationary damping surface, which ends in a sharp rear edge and 2 is the elevator (rudder) arranged to the rear of this surface. The pivotal axis 3 of this rudder is arranged in the damping surface and in front of the front edge 4 of the rudder. The pivot 3 is connected with the rudder by arms 5, which are formed with extensions 6 and 7, to which are connected the control wires 8 and 9.

If the rudder is deflected in one or the other direction, there is formed between the rear edge 10 of the damping surface 1 and the front edge 4 of the rudder 2 a nozzle-shaped gap 11 through which air can flow from the pressure side (the top side in Fig. 2) to the suction side, as shown by the arrow. In consequence of this passage of air the "tearing off" of the flow at the rudder arises only at a greater angular deflection than in the case where no such gap is provided and where the front edge of the rudder always remains to the rear of the rear edge of the damping surface. There further follows that more especially at greater angular deflection of the rudder the forces of the air acting on the rudder will be greater than in the arrangements hitherto used. It is true that the new arrangement involves a certain drawback inasmuch as the turning moments exerted on the rudder 2 by the forces of air with regard to the pivotal axis 3 are greater than in the case where the pivotal axis extends through the rudder itself. However, this drawback can easily be avoided if necessary, for instance by providing a balancing surface 12 of a well known type (shown in dotted lines), which is arranged in front of the pivotal axis.

In the arrangement of parts illustrated in Figs. 3 and 4, not only the rudder 22 but also the damping surface 21 are arranged for oscillatory movement about the stationary axis 23, for instance by means of wires or cables 28, 29, each of which is subdivided in two branches, the branches 33, 34 being connected to a segment 24 secured to the damping surface 21, while the branches 35, 36 are connected to the segment 25 fixed to the rudder 22. The radius of the segment 25 is materially smaller than the radius of the segment 24, and therefore, as the cables 33, 35 and 34, 36 always move the same distance, the rudder 22, when being deflected will rock through a materially greater angle than the damping surface 21, as shown in Fig. 4. In consequence thereof there is formed a nozzle-shaped gap 31, through which air can pass from the pressure side to the suction side as shown by the arrow. This arrangement involves the advantage as compared with that shown in Figs. 1 and 2, that its effect is greater inasmuch as the damping surface furnishes an additional substantial component of air force. Further the air forces $P_1$ and $P_2$ acting on the damping surface and the rudder, respectively, form turning moments, which are oppositely directed with regard to the pivotal axis 23, so that a fair equilibrium of forces is obtained. In consequence thereof the rudder can easily be operated without any balancing surfaces and the like being required. The middle position of the combined damping surface and rudder relative to the main axis of the aircraft can be adjusted by means of well known adjusting members 41, 42, inserted in the cables 28, 29, while similar members 43, 44, inserted in the cables 35, 36 allow adjusting the position of alignment.

In the flying machine illustrated in Figs. 5 and 6 all members forming part of the directional controlling means are designed in accordance with the present invention. The ailerons provided at the outer ends of the wings 51, 51' are designed substantially as shown in Figs. 1 and 2, the wing ends themselves forming the stationary damping surfaces, which in the present case, unlike the customary form, end in a sharp rear edge 60, 60', as can be seen in Fig. 5. To these portions of the wings the ailerons 52, 52' are connected for rocking motion about the axes 53, 53' in such manner that, whenever the ailerons are rocked relative to the wings 51, 51', a nozzle-like gap is formed between the parts.

The elevator provided at the tail end of the fuselage is designed in accordance with Figs. 3 and 4. It is formed of a fin 61 rockable about a horizontal axis 63 and the elevator proper 62 rockable about the same axis. Both parts carry segments 64, 65, to which are attached wires or cables 33, 34 and 35, 36, respectively. The upper cables 33, 35 are combined into a common branch 28, the lower cables 34, 36 into a common branch 29. The branch cables 28, 29 lead to the control stick 30, so that by rocking this stick the surfaces 61, and 62 can be adjusted. The horizontal fin or stabilizer 61 is narrower in the middle and this narrower part extends across an opening 67 in the fuselage, which is large enough to allow the fin 61 to rock as desired.

The rudder, which is also provided at the tail end is formed in the manner illustrated in Figs. 1 and 2. It consists of the stationary vertical fin 71 and the rudder 72 connected therewith and rockable about an axis 73. This rudder extends also beyond the vertically extending rear end of the fuselage 100, which, like the fin 71, also ends in a sharp rear edge 80, so that on the rudder 72 being rocked to one or the other side, the nozzle-like gap shown in Fig. 2 is formed. The rudder 72 is adjusted by means of the control stick 90 and wires or cables 91, 92, which lead to the levers 76, 77, fixed on the rudder 72.

The cables or wires can be replaced by other controlling means, for instance by rods connected to levers, which are so dimensioned that the rudder will be deflected through a greater angle than the damping surface.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In aircraft a damping surface having a sharp rear edge and a rudder of streamlined cross section to the rear of said edge and pivoted to an axis extending across said surface, the pivotal axis of said rudder being disposed forward of said rear edge.

2. In aircraft a damping surface having a sharp rear edge and a rudder of streamlined cross section to the rear of said edge and pivoted to an axis extending across said surface, the pivotal axis of said rudder being disposed forward of said rear edge, both said surface and said rudder being arranged for rocking motion, and means for positively coupling said parts in such manner that said rudder will always rock through a greater angle than said surface.

3. In aircraft a damping surface having a sharp rear edge and a rudder of streamlined cross section to the rear of said edge and pivoted to an axis extending across said surface, the pivotal axis of said rudder being disposed forward of said rear edge, both said surface and said rudder being arranged for rocking motion, and means for positively coupling said parts in such manner that said rudder will always rock through a greater angle than and in the same direction as said surface.

4. In aircraft a damping surface having a sharp rear edge and a rudder of streamlined cross section to the rear of said edge and pivoted to an axis extending across said surface and means whereby, on said rudder being deflected relative to said surface, a nozzle-like gap is formed between them.

5. In aircraft a damping surface having a sharp rear edge and a rudder of streamlined cross section to the rear of and pivoted to an axis extending across said surface, the pivotal axis of said rudder being disposed forward of said rear edge, both said surface and said rudder being arranged for rocking motion, and means for positively coupling said parts in such manner that said rudder will always rock through a greater angle than said surface, the gear ratio for said surface and said rudder and the position of the pivotal axis of said surface being so chosen that the turning moments of the air forces acting on said surface and said rudder with regard to said axis are substantially mutually balanced.

In testimony whereof I affix my signature.

HUGO JUNKERS.